United States Patent [19]

Fox et al.

[11] Patent Number: 4,723,087

[45] Date of Patent: Feb. 2, 1988

[54] PIEZOELECTRIC IMPACT SENSOR

[75] Inventors: David R. Fox; David Armitage, both of Wiltshire, England

[73] Assignee: Raychem Ltd., England

[21] Appl. No.: 905,740

[22] Filed: Aug. 27, 1986

[30] Foreign Application Priority Data

Sep. 9, 1985 [GB] United Kingdom ............... 8522337

[51] Int. Cl.[4] ............................................. H01L 41/08
[52] U.S. Cl. ..................................... 310/329; 310/339; 310/800
[58] Field of Search ............... 310/329, 338, 339, 800; 102/70.2; 73/517 R, 488

[56] References Cited

U.S. PATENT DOCUMENTS

| | | | |
|---|---|---|---|
| 2,691,159 | 10/1954 | Heibel | 310/339 X |
| 2,764,091 | 9/1956 | Hudson et al. | 310/339 X |
| 2,871,787 | 2/1959 | Rizer et al. | 310/339 X |
| 2,892,411 | 6/1959 | Brown et al. | 310/339 X |
| 3,006,280 | 10/1961 | Rogers et al. | 310/339 X |
| 3,030,527 | 4/1962 | Czyryk et al. | 310/339 X |
| 3,106,161 | 10/1963 | Wallbaum et al. | 310/339 X |
| 3,320,890 | 5/1967 | Ciccone et al. | 310/339 X |
| 3,337,758 | 8/1967 | Brothers | 310/339 X |
| 3,349,709 | 10/1967 | Vilbajo | 310/339 X |
| 3,389,275 | 6/1968 | Brothers | 310/339 X |
| 3,464,531 | 9/1969 | Herr et al. | 310/339 X |
| 3,750,127 | 7/1973 | Ayers et al. | 310/800 X |
| 3,801,839 | 4/1974 | Yo | 310/800 X |
| 3,850,102 | 11/1974 | Morrow . | |
| 3,977,328 | 8/1976 | Brown et al. | 310/339 X |
| 4,275,658 | 7/1981 | Gottron et al. . | |
| 4,378,721 | 4/1983 | Kaneko et al. | 310/800 X |
| 4,499,394 | 2/1985 | Koal | 310/800 X |
| 4,512,431 | 4/1985 | Bloomfield | 310/800 X |
| 4,568,851 | 2/1986 | Soni et al. | 310/800 |
| 4,600,855 | 7/1986 | Strachan | 310/800 X |

FOREIGN PATENT DOCUMENTS

| | | |
|---|---|---|
| 121494 | 4/1984 | European Pat. Off. . |
| 100847 | 6/1984 | European Pat. Off. . |
| 1306756 | 9/1962 | France ............................ 310/339 |
| 1410786 | 7/1975 | United Kingdom . |

*Primary Examiner*—Mark O. Budd
*Attorney, Agent, or Firm*—Yuan Chao; Edith A. Rice; Herbert G. Burkard

[57] ABSTRACT

An impact sensing arrangement comprises a pair of bodies that are separated from each other and arranged so that an impact on one of the bodies will cause it to move toward the other body, and an elongate piezoelectric pressure sensing element that is positioned between the bodies, the pressure sensing element being mechanically coupled to each of the bodies over at least one quarter and preferably at least two thirds, the width of the sensing element.

The arrangement is particularly suitable for use in an ordance projectile in which case the sensing element 10 may extend in a loop around the projectile between the nose 3 and body 2 of the projectile.

10 Claims, 4 Drawing Figures

U.S. Patent Feb. 2, 1988 4,723,087
Fig. 1.
Fig. 2.
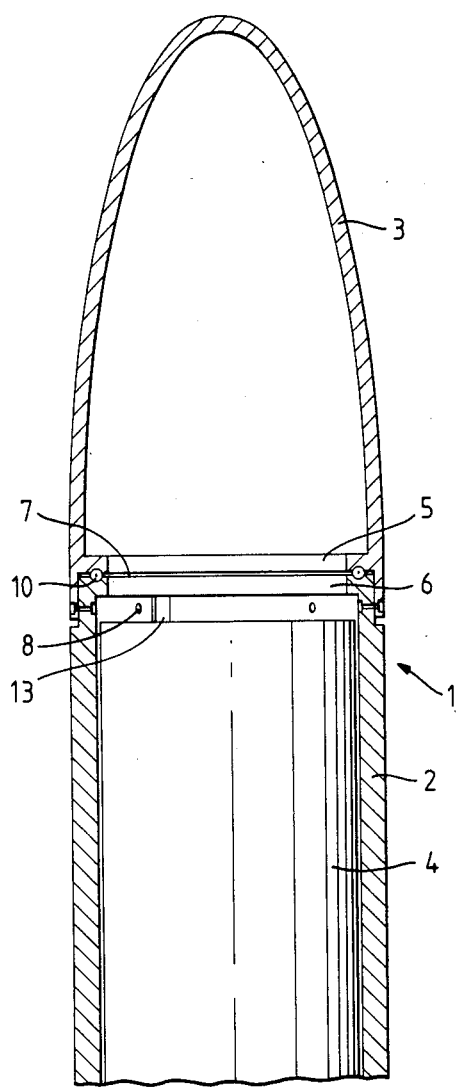
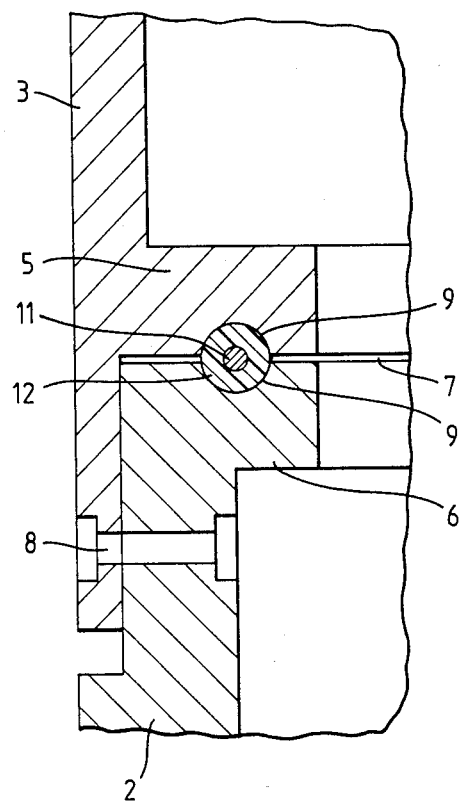

PIEZOELECTRIC IMPACT SENSOR

This invention relates to impact sensors and to certain devices that use such sensors.

One field in which impact sensors are particularly important is that of impact detonation explosive devices, and especially impact detonation projectiles. Many impact sensors for such devices have been proposed in the past including sensors based on piezoelectric ceramic elements. However, such sensors have generally had a number of drawbacks, for example many sensors are relatively bulky or heavy, either inherently bulky by virtue of their design or by virtue of the necessity of employing a separate energy generator to supply electrical energy to the detonation charge. Other designs often have the drawback that, although they are sensitive to frontal impacts, they are relatively insensitive to glancing impacts for example where the plane of the impacting surface may be oriented at an angle as little as 20° to the direction of travel of the projectile.

According to the present invention, there is provided an impact sensing arrangement, which comprises a pair of bodies that are separated from each other and arranged so that an impact on one of the bodies will cause it to move toward the other body, and an elongate piezoelectric pressure sensing element that is positioned between the bodies so that the bodies are located on opposite sides of the pressure sensing element, the pressure sensing element being mechanically coupled to each of the bodies over at least one quarter of the width of the sensing element before the impact.

Preferably the pressure sensing element is mechanically coupled to at least one body, and especially both bodies, over at least one third, more preferably at least one half, most preferably at least two thirds, and especially over substantially the entire width of the sensing element (the term "width" meaning the projected lateral dimension of the sensing element as viewed from the bodies).

The pressure sensing element may be formed from any of a number of piezoelectric materials, provided that it is possible to be formed in extended lengths. Thus, for example, the sensing element may be formed from a particulate piezoceramic material e.g. barium titanate or lead zirconate titanate, that is dispersed in a polymeric matrix, although it is preferred for the piezoelectric material itself to be polymeric. Polymeric materials that may be rendered piezoelectric include odd numbered nylons such as nylon 5, nylon 7 or nylon 11, polyhydroxybutyrate, vinylidine cyanide/vinyl acetate copolymers and vinylidine fluoride polymers. The term "vinylidine fluoride polymer" is intended to include polyvinylidine fluoride, commonly abbreviated to "PVDF" or "PVF$_2$" and those copolymers of vinylidine fluoride in which a piezoelectric activity may be generated. Suitable copolymers include copolymers and terpolymers of vinylidine fluoride with vinyl fluoride, trifluoroethylene, tetrafluoroethylene, vinyl chloride and chlorotrifluoroethylene. In addition, blends of vinylidine fluoride polymers with other polymers e.g. polymethylmethacrylate, are included provided that are piezoelectric activity thereof is not destroyed. Preferably the pressure sensing element comprises a vinylidine fluoride polymer and especially polyvinylidine fluoride.

Materials are usually rendered piezoelectric by a process involving polarizing the material at a high electric field gradient e.g. from 5 to 200 MVm$^{-1}$, optionally simultaneously with, or subsequent to an orientation step in the case of polymeric materials. Preferably the pressure sensing element is in direct contact with at least one of the bodies and especially with both bodies, in which case it is preferred for the pressure sensing element to be arranged between the bodies so that it has a direction of polarization that is substantially parallel to the relative direction of motion of the bodies during the impact over at least part of the area in which the sensing element is in contact with the or each body. The pressure sensing element may, for example, have a rectangular cross-section, and have a direction of polarization normal to two opposed surfaces thereof, in which case the element is preferably arranged between the bodies so that the direction of polarization extends from one body to the other. This form of pressure sensing element may be formed by orienting and poling a polymeric sheet which is then cut into strips along the direction of orientation. Electrodes will usually be provided on the polymeric material, preferably before it is cut into strips, although it is possible for the bodies themselves to act as the electrodes.

Preferably the piezoelectric pressure sensing element has a coaxial geometry, and especially is in the form of a coaxial cable. Examples of coaxial pressure sensing elements are described in British Patent Applications Nos. 2,150,345A, 2,150,346A and 2,132,602A, European Patent Application No. 89,770, and in U.S. Pat. Nos. 4,303,733 and 4,369,391, the disclosures of which are incorporated herein by reference. The term "coaxial cable" is not intended to imply that the central conductor and the outer conductor thereof must be exactly concentric, but rather simply that the central conductor is surrounded by, and insulated from, the outer conductor by a piezoelectric dielectric. It will be appreciated that some deviation from absolute concentricity is often the case in coaxial cables and in some cases this may be intended. Where the pressure sensing element is in the form of a coaxial cable, the direction of polarization of the piezoelectric material will not be parallel throughout the material but it will instead be oriented radially from the central conductor. In this case it will be desirable for the sensing element to contact the bodies along the central region of each side of the sensing element, that is to say, so that the bodies contact the sensing elements on opposite sides of the central conductor, because along that region the direction of polarization will be parallel to the relative direction of motion of the bodies during the impact. If the coaxial pressure sensing element is mechanically coupled to the bodies by means of direct contact therewith, it is preferred for the element to be located in a groove in each of the bodies, which groove is preferably part-circular. Preferably the grooves are almost semi-circular in order for the bodies to contact the sensing element over substantially its entire width, although it will be appreciated that the grooves should not both be exactly semi-circular (to receive half each of the sensing element) since this would prevent the bodies moving toward each other on impact.

Since the coaxial form of pressure sensing element will be radially polarized and since it is preferred to maximise the mechanical coupling efficiency in the radial direction, in order to generate a d$_{33}$ signal, it is possible to improve the mechanical coupling efficiency by configuring the bodies so that they together provide more than two, e.g. three or four contact surfaces which, on impact, bear on the sensing element radially. Alternatively it is possible to couple either or both the bodies to the sensing element via a liquid coupling medium so that all the impact force is coupled to the sensing element radially. However, such arrangements increase the complexity of the sensing arrangement, and since an arrangement employing simply a substantially semi-circular groove in each body will give almost two thirds of the theoretical maximum coupling efficiency, there is usually no necessity to employ more complex arrangements.

The pressure sensing element may be located between the two bodies in a number of different configuration. Preferably the element extends in at least two directions over the surface of each body, for example it may be laid in a serpentine configuration or, more preferably, in a closed loop, in order to detect impacts directed at various angles to one of the bodies.

The arrangement is particularly suited to the detection of impacts in impact detonated explosive devices for example mines or projectiles including artillary shells, bombs and self-propelled missiles. The arrangement has the advantage that is occupies very little space within the device since the pressure sensing element may be arranged in the form of a closed loop extending along the peripheral region of the device thereby allowing the interior of the device to be employed for other purposes. In addition, it is possible for the arrangement to generate sufficient electrical energy sufficiently rapidly that it can be used directly to actuate a detonation charge thereby obviating the requirement for a separate electrical energy generator and so reducing further the bulk of the sensing/ignition system. Furthermore, if the sensing element is located along the peripheral region separating two parts of the projectile, for example between the projectile nose shell and the projectile casing, it is possible for the sensing arrangement to generate a sufficiently large electrical signal to detonate the projectile even when the projectile strikes a surface at a very small, glancing angle for example about 15° or less, for example about 10°.

Several embodiments of the present invention will now be described by way of example with reference to the accompanying drawings in which:

FIG. 1 is a schematic sectional view along the axis of part of an impact detonation projectile according to the invention;

FIG. 2 is an enlarged view of part of FIG. 1 showing the impact sensing arrangement in greater detail.

Figure 3:
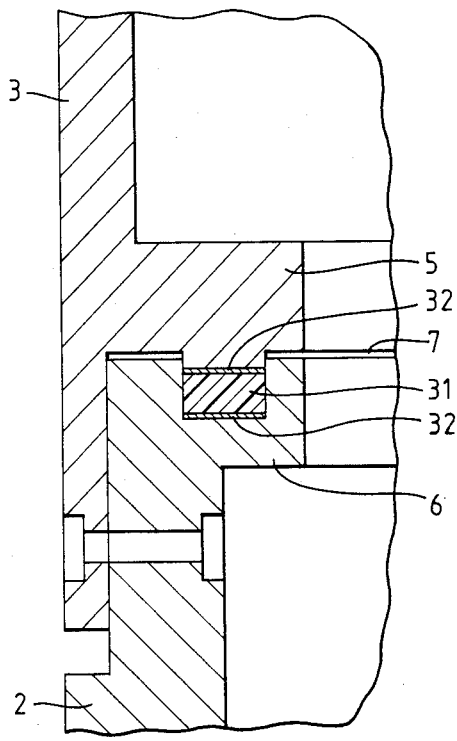
FIGS. 3 and 4 show alternative forms of sensing arrangement.

Referring to FIGS. 1 and 2 of the accompanying drawings, an impact detonation projectile 1 has a casing 2 and a separately formed nose 3. The interior of the casing 2 contains an explosive charge 4 while the interior of the nose 3 may, depending on the type of projectile, contain electronic equipment (not shown) such as a proximity detector, or may contain additional explosive charge.

The nose 3 is provided with an inwardly directed annular flange 5, and the casing is provided with a corresponding flange 6 so that when the nose and casing are positioned together as shown, the flanges are located adjacent to one another and are separated by a small gap 7. Apertures 8 are provided in both the casing 2 and the nose 3 which are aligned when the nose and casing are correctly assembled and which can receive shear bolts (not shown) to secure the nose and casing together. The flanges 5 and 6 are each provided with an annular groove 9 of substantially semi-circular cross section, the two grooves together providing a recess in which a length of piezoelectric coaxial cable 10 is located. The grooves are of such a size that when the nose 3 and casing 2 are assembled, the coaxial cable 10 fits snugly within the grooves and is compressed by a force of not more than about 100N per meter of cable. The coaxial cable 10 has a low melting point alloy central conductor 11, a polyvinylidine fluoride dielectric 12, a silver paint outer conductor and optionally an insulating jacket. The cable 10 has been formed as described in British Patent Application No. 2,150,345A by a process which involves axially orienting the dielectric by a stretch ratio of about 4:1 and radially poling the dielectric. The coaxial cable 10 may be terminated in the region of the annular flange 6 and a twisted pair or flat cable 13 transmits the piezoelectric signal generated to the detonation charge via a conventional safety and arming arrangement.

In operation, when the projectile strikes the target, impact of the target on the nose 3 will cause the shear bolts located in the apertures 8 to break and the nose to move rearwardly toward the casing 2. As the nose 3 moves toward the casing, the piezoelectric coaxial cable is compressed and the resulting signal can be used directly to ignite the detonation charge. When the coaxial cable is mounted as shown in FIG. 2, peak voltages of 1600V with a rise time of 1.5 microseconds, and peak energies of 5.3 mJ with a rise time of 3.8 microseconds have been observed. The peak voltage and energy is found to be considerably higher for this arrangement and the rise times much shorter than if the coax cable 10 were held between two flat surfaces.

An advantage of the design shown in FIGS. 1 and 2 is that if the projectile nose strikes the target at a glancing angle, for example if the surface plane of the target is at an angle of about 15° to the axis of the projectile, impact of the target on one side of the nose 3 will cause that part of the flange 5 on the opposite side of the nose to move toward flange 9 and compress the coaxial cable, thereby still causing ignition of the detonation charge.

FIG. 3 shows a modification of the sensing arrangement in which an elongate piezoelectric pressure sensor comprises a strip 31 of oriented polyvinylidene fluoride having electrodes 32 on opposite surfaces. The strip 31 has been poled across the electrodes so that the direction of poling is parallel to the axis of the projectile, and is located in a recess in the flange 6. This modification has the advantage that the compressive forces acting on the strip 31 by the flanges 5 and 6 are parallel to the direction of poling of the strip throughout its width, but has the disadvantage as compared with the arrangement shown in FIG. 2 that the pressure sensing strip is not inherently screened against electromagnetic interference.

Figure 4:
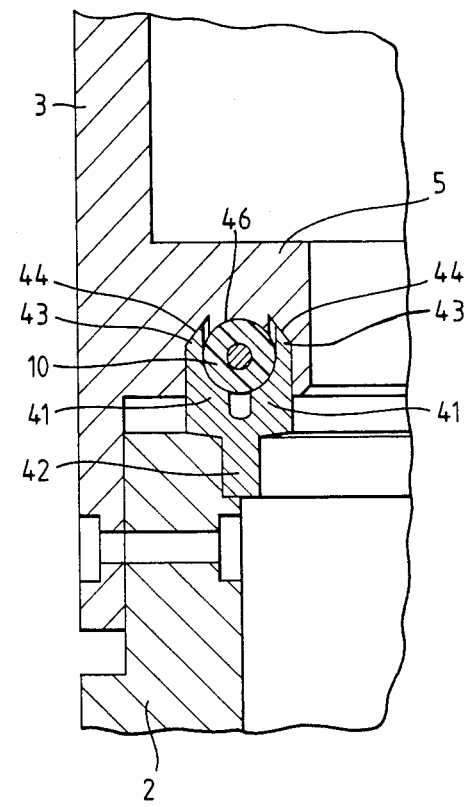

FIG. 4 shows another modification of the sensing arrangement shown in FIG. 2 in which the piezoelectric coaxial cable 10 is held in a substantially semi-circular groove formed between the arms 41 of a bifurcated holder 42 supported on the casing 2. Each arm 41 has a bevelled end region 43 which contacts correspondingly profiled surfaces 44 formed in the flange 5. The flange 5 also has a shallow partcircular groove 46 formed therein so that the cable 10 is held substantially symetrically between the groove 46 and the arms 41 of the holder 41. When the projectile is subjected to an impact, movement of the nose 3 and flange 5 toward the casing 3 will cause the surfaces 44 in the flange 5 to force the arms 41 of the holder 42 together, and thereby cause the piezoelectric coaxial cable 10 to be compressed symetrically about its axis by three surfaces.

We claim:
1. A projectile comprising
    (a) a nose;
    (b) a housing separated from the nose and arranged so that an impact on the nose will cause it to move toward the housing, and vice-versa;
    (c) a piezoelectric polymer pressure sensing element positioned between the nose and the housing and extending substantially peripherally around the projectile between the nose and the housing, the pressure sensing element being mechanically coupled to each of the nose and the housing such that the impact will compress the pressure sensing element, causing it to generate an electrical signal.
2. A projectile according to claim 1, wherein the pressure sensing element is in direct contact with at least one of the nose and the housing.
3. A projectile according to claim 2, wherein the pressure sensing element has a direction of polarization that is parallel to the relative direction of motion of the nose and housing during impact over at least a part of the area in which the sensing element is in contact with the nose or housing.
4. A projectile according to claim 1, wherein the piezoelectric polymer of the pressure sensing element comprises a vinylidene fluoride homo- or copolymer.
5. A projectile according to claim 4, wherein the piezoelectric polymer comprises poly(vinylidene fluoride).
6. A projectile according to claim 1, wherein the pressure sensing element has a coaxial geometry.
7. A projectile according to claim 1, wherein the pressure sensing element has a substantially rectangular cross-section.
8. A projectile according to claim 1, wherein the nose and the housing each have a flange, the flanges each having a substantially semi-circular groove and the grooves together forming a recess within which the pressure sensing element is located.
9. A projectile according to claim 8, wherein the pressure sensing element is a poly(vinylidene fluoride) coaxial cable.
10. A projectile according to claim 1, including a detonation charge that is detonated directly by the electric signal generated by the pressure sensing element.

* * * * *